(12) United States Patent
Parker et al.

(10) Patent No.: US 10,544,825 B2
(45) Date of Patent: Jan. 28, 2020

(54) SOCKET ASSEMBLY

(71) Applicant: Federal-Mogul Motorparts Corporation, Southfield, MI (US)

(72) Inventors: Glen C. Parker, St. Peters, MO (US); Kurt R. Bretz, Albers, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 0 days.

(21) Appl. No.: 15/209,100

(22) Filed: Jul. 13, 2016

(65) Prior Publication Data

US 2017/0130767 A1 May 11, 2017

Related U.S. Application Data

(60) Provisional application No. 62/253,281, filed on Nov. 10, 2015.

(51) Int. Cl.
*F16C 11/06* (2006.01)

(52) U.S. Cl.
CPC ........ *F16C 11/068* (2013.01); *F16C 11/0685* (2013.01)

(58) Field of Classification Search
CPC ..... Y10T 403/32713; Y10T 403/32721; Y10T 403/32737; Y10T 403/32762; Y10T 403/32811; F16C 11/0628; F16C 11/0633; F16C 11/0638; F16C 11/0666; F16C 11/0671; F16C 11/068; F16C 11/0685;
(Continued)

(56) References Cited

U.S. PATENT DOCUMENTS 3,027,182 A     3/1962   Reuter
4,231,673 A * 11/1980   Satoh .................. F16C 11/0633
                                                                                                      403/125
(Continued)

FOREIGN PATENT DOCUMENTS

JP    H01171920 U   12/1989
JP    2006300264 A   11/2006
(Continued)

OTHER PUBLICATIONS

International Search Report, dated Jan. 4, 2017 (PCT/US2016/061213).

*Primary Examiner* — Jonathan P Masinick
(74) *Attorney, Agent, or Firm* — Robert L. Stearns; Dickinson Wright, PLLC

(57) ABSTRACT

The socket assembly includes a housing with an inner bore which extends along an axis from a first end to an second end. A ball portion of a ball stud is received in the inner bore, and with a shank portion of the ball stud projects through the second end. A backing bearing is disposed in the inner bore and has a bearing surface which is in surface-to-surface contact with an outer surface of the ball portion for enabling relative rotation between the housing and the ball stud. The backing bearing also has a lubricant opening which extends therethrough and a plurality of lubricant wells which are spaced around the bearing surface from one another for holding a lubricant. The backing bearing lubricant grooves which are formed into the bearing surface and extend from the lubricant opening to the lubricant wells for filling the lubricant wells with lubricant.

11 Claims, 3 Drawing Sheets

(58) Field of Classification Search
CPC . F16C 11/069; F16C 2326/05; F16C 2326/24
USPC .................. 403/132, 133, 135, 138, 144
See application file for complete search history.

(56) References Cited

U.S. PATENT DOCUMENTS

| | | | | |
|---|---|---|---|---|
| 5,368,408 | A * | 11/1994 | Shimizu | F16C 11/0638 403/133 |
| 5,772,337 | A * | 6/1998 | Maughan | F16C 11/0638 384/206 |
| 6,042,293 | A * | 3/2000 | Maughan | F16C 11/068 403/135 |
| 6,164,861 | A * | 12/2000 | Maughan | F16C 11/0638 403/133 |
| 8,047,739 | B2 * | 11/2011 | Sellers | F16C 11/069 403/122 |
| 8,678,656 | B2 * | 3/2014 | Richter | F16C 11/0638 384/213 |
| 2006/0171775 | A1 * | 8/2006 | McLaughlin | F16C 11/0614 403/122 |
| 2010/0067976 | A1 * | 3/2010 | Goerg | F16C 11/0671 403/134 |
| 2014/0086667 | A1 * | 3/2014 | Elterman | F16C 11/0633 403/122 |
| 2014/0205366 | A1 * | 7/2014 | Mevorach | B60G 7/005 403/144 |
| 2018/0258983 | A1 * | 9/2018 | Reddehase | F16C 11/0628 |

FOREIGN PATENT DOCUMENTS

| | | | | |
|---|---|---|---|---|
| JP | 2009144749 A | | 7/2009 | |
| JP | 4573694 B2 * | | 11/2010 | ......... F16C 11/0638 |
| JP | 5059576 B2 * | | 10/2012 | ............. F16C 11/06 |
| WO | 2006110133 A1 | | 10/2006 | |

* cited by examiner

SOCKET ASSEMBLY

CROSS-REFERENCE TO RELATED APPLICATIONS

This application claims the benefit of and priority to U.S. Provisional Patent Application No. 62/253,281, filed Nov. 10, 2015, the entire disclosure being considered part of the disclosure of this application and hereby incorporated by reference.

BACKGROUND OF THE INVENTION

1. Technical Field

This invention relates generally to ball joint assemblies and more particularly to compression loaded ball joint assemblies of the type for use in vehicle suspension and steering systems.

2. Related Art

Socket assemblies find uses in a range of different automotive and non-automotive applications for establishing a movable connection between two or more components. For example, most automobile suspension and steering systems include a plurality of socket assemblies which interconnect knuckles with tie rod ends and with control arms. Such socket assemblies often include a housing which has an open bore and a ball stud that is partially received in the open bore and projects out of the housing. One or more bearings are also included to provide a low friction interface between the ball stud and the housing, thereby facilitating pivoting and rotation of the ball stud and the housing relative to one another during operation of the suspension or steering system. Some socket assembly manufacturers provide grooves in their bearings for distributing a lubricant, such as grease, around the interface between the ball stud and the bearing and for conveying the lubricant past the bearing to other areas of the socket assembly.

SUMMARY OF THE INVENTION AND ADVANTAGES

One aspect of the present invention provides for a socket assembly including a housing with an inner bore which extends along an axis from a first end to an open second end. The socket assembly further includes a ball stud with a ball portion that is received in the inner bore of the housing and with a shank portion that projects out of the inner bore through the open second end. A backing bearing is disposed in the inner bore of the housing adjacent the first end. The backing bearing has a bearing surface which is in surface-to-surface contact with an outer surface of the ball portion of the ball stud for enabling relative rotation between the housing and the ball stud. The backing bearing also has a lubricant opening which extends therethrough and a plurality of lubricant wells which are spaced around the bearing surface from one another for holding a lubricant. The backing bearing additionally has at least one lubricant groove which is formed into the bearing surface and extends from the lubricant opening to at least one of the lubricant wells for replenishing the at least one lubricant well during regreasing of the socket assembly.

The lubricant wells ensure that lubricant, such as grease, is maintained around the bearing surface to ensure that the surface-to-surface contact between the ball portion of the ball stud and the bearing surface has adequate lubrication, even after the socket assembly has sat motionless for a period of time. The lubricant grooves ensure that the lubricant wells are regularly refilled with the lubricant during routine maintenance of the socket assembly without the mechanic doing anything other than following the normal procedure for relubricanting a socket assembly.

According to a further aspect of the present invention, at least one of the lubricant wells extends less than fully though the backing bearing.

According to another aspect of the present invention, at least one of the lubricant grooves extends from one of the lubricant wells to another of the lubricant wells.

According to yet another aspect of the present invention, the at least one lubricant groove is further defined as a plurality of lubricant grooves which extend from the lubricant opening to at least two of the lubricant wells.

According to still another aspect of the present invention, at least one of the lubricant grooves does not extend to any of the lubricant wells for allowing lubricant to pass the backing bearing during regreasing.

According to a further aspect of the present invention, the bearing surface of the backing bearing further includes a cylindrical portion with a generally constant diameter that extends along a predetermined length and that is in slidable contact with an equator of the ball portion of the ball stud.

According to yet a further aspect of the present invention, the socket assembly further includes an exit bearing which is received in the inner bore of the housing and is in surface-to-surface contact with the ball portion of the ball stud.

According to still a further aspect of the present invention, the socket assembly further includes a spring which biases one of the exit and backing bearings against the ball portion of the ball stud.

According to another aspect of the present invention, a boot is sealed against the housing and against the ball stud, and the spring is a portion of the boot.

According to yet another aspect of the present invention, the socket assembly further includes a cover plate which is disposed in the inner bore adjacent the open second end of the housing.

According to still another aspect of the present invention, the open second end of the housing is deformed to trap the cover plate in the inner bore of the housing.

According to a further aspect of the present invention, the housing has a wall at the first end.

According to yet a further aspect of the present invention, the wall at the first end of the housing has a lubricant opening which is co-axially aligned with the lubricant opening of the backing bearing.

According to still a further aspect of the present invention, the backing bearing is separately constructed and non-integral with the housing.

According to another aspect of the present invention, the bearing surface of the backing bearing has a radius of curvature which matches a radius of curvature of the outer surface of the ball portion of the ball stud.

Another aspect of the present invention provides for a method of making a socket assembly. The method includes the step of preparing a housing with an inner bore which extends along an axis from a first end to an open second end. The method proceeds with the step of inserting a backing bearing with a bearing surface and with a lubricant opening into the inner bore of the housing. The method continues with the step of inserting a ball portion of a ball stud into the inner bore of the housing such that an outer surface of the ball portion is in surface-to-surface contact with the bearing surface of the backing bearing to facilitate relative rotation between the housing and the ball stud. The method proceeds with the step of injecting a lubricant into the inner bore of the housing. The method continues with the step of channeling the lubricant through at least one lubricant groove formed into the bearing surface of the backing bearing from the lubricant opening of the backing bearing to at least one lubricant well formed into the backing bearing to fill the lubricant well with the lubricant.

According to another aspect of the present invention, at least one of the lubricant wells extends less than fully through the backing bearing.

According to yet another aspect of the present invention, the method further includes the step of channeling the lubricant from at least one lubricant well to another lubricant well through at least one lubricant groove.

According to still another aspect of the present invention, the method further includes the step of channeling from the lubricant opening in the backing bearing to an opposite side of the backing bearing through at least one lubricant groove that does not encounter any lubricant wells.

According to a further aspect of the present invention, the backing bearing has a cylindrical portion which extends along a predetermined length with a generally constant diameter and which is in slidable contact with an equator of the ball portion of the ball stud.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF PRESENTLY PREFERRED EMBODIMENTS

Figure 1:
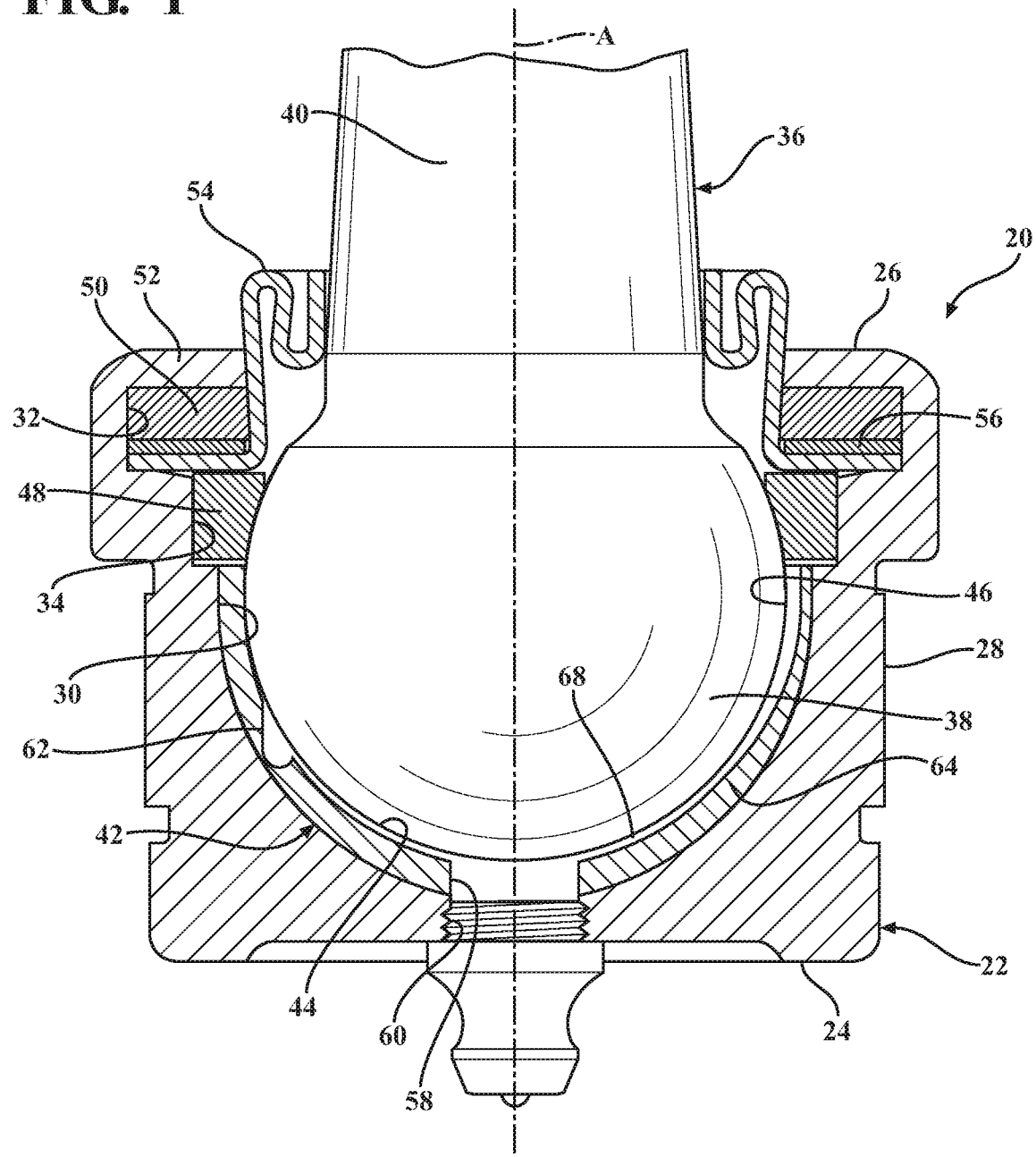
FIG. 1 is a partial cross-sectional view of an exemplary socket assembly constructed according to one aspect of the present invention.

Referring to the Figures, wherein like numerals indicate corresponding parts throughout the several views, an exemplary embodiment of an improved socket assembly 20 is generally shown in FIG. 1. The exemplary embodiment of the socket assembly 20 is a compression loaded ball joint assembly 20 for joining two components (such as a control arm and a knuckle) of a vehicle suspension or steering system. However, it should be appreciated that the socket assembly 20 could find uses in a range of automotive and non-automotive applications.

Referring still to FIG. 1, the ball joint assembly 20 includes a housing 22 which extends along an axis from an at least substantially closed first end 24 to an open second end 26. In the exemplary embodiment, the housing 22 is of a cartridge style in that it has an outer surface 28 which is generally cylindrical in shape for press-fitting the housing 22 into an opening of one of a suspension or steering assembly component, such as a control arm. However, it should be appreciated that the housing 22 could have a range of shapes or configurations and could be incorporated into a body of the component. The housing 22 is preferably made of metal (such as cast iron, steel or a steel alloy) and may be shaped through any suitable process or combination of processes including, for example, forging, casting and/or machining.

The housing 22 also has an inner surface 30 which surrounds an inner bore, or open interior, within which other components of the ball joint assembly 20 are received. Adjacent the first closed end 24 of the housing 22, the inner surface 30 is generally spherically curved, and adjacent the open end 26 of the housing 22, the inner surface 30 is double counterbored. That is, the inner bore presents a first counterbore 32 with a first diameter and a second counterbore 34 with a second diameter that is less than the first diameter. Between the first and second counterbores 32, 34, the inner surface 30 tapers radially inwardly from the first counterbore 32 to the second counterbore 34, i.e., in a direction towards the closed first end 24 of the housing 22.

The exemplary embodiment of the ball joint assembly 20 further includes a ball stud 36 with a generally semi-spherically shaped ball portion 38 that is fully received within the open bore of the housing 22. The ball stud 36 also includes a shank portion 40 which is integrally attached with the ball portion 38 and which projects out of the housing 22 through the second open end 26 of the housing 22. In the exemplary embodiment, the shank portion 40 of the ball stud 36 extends to a distal end that is threaded for receiving a nut (not shown) for locking the ball stud 36 into engagement with another component (such as a steering knuckle). The ball stud 36 may be made of any suitable material, such as hardened steel, and may be shaped through any suitable process, such as casting, machining or forging. In the exemplary embodiment, the ball stud 36 is made as a single, integral piece of material. However, the ball stud 36 could alternately be made of multiple pieces which are separately formed and are subsequently joined together.

The exemplary embodiment of the ball joint assembly 20 also includes a first bearing 42 (hereinafter referred to as a "backing bearing 42") which is received within the open bore of the housing 22 between the ball portion 38 of the ball stud 36 and the inner surface 30 of the housing 22 for providing a low friction interface with the ball stud 36 to allow the ball stud 36 and housing 22 to freely pivot and rotate relative to one another during operation of the vehicle suspension or steering assembly. Specifically, the backing bearing 42 provides a low friction interface with a lower hemisphere of the ball portion 38 and an equator of the ball portion 38.

The backing bearing 42 is generally cup or dome shaped in that it has an outer surface which generally matches the inner surface 30 of the housing 22 and a bearing surface with a generally semi-spherical portion 44 and a cylindrical portion 46. The semi-spherical portion 44 of the bearing surface is located adjacent the closed end 24 of the housing 22 and has a radius of curvature which generally matches that of an outer surface of the ball portion 38 of the ball stud 36 to establish surface-to-surface contact between the semi-spherical portion 44 of the bearing surface of the backing bearing 42 and a lower hemisphere of the ball portion 38 of the ball stud 36 for transferring axial forces between the ball stud 36 and the housing 22 during operation of the vehicle suspension or steering assembly. The backing bearing 42 may be made through any suitable process or combination of processes and may be of a range of materials including, for example, steel, a steel alloy, a powdered metal or a polymeric material.

The cylindrical portion 46 of the bearing surface of the backing bearing 42 has a generally constant diameter which extends along a predetermined distance for contacting an equator, or center-line, of the ball portion 38 of the ball stud 36 and for transferring radial forces between the ball stud 36 and the housing 22 during operation of the vehicle suspension or steering assembly. The generally constant diameter of the cylindrical portion 46 of the bearing surface generally matches an outer diameter of the ball portion 38 of the ball stud 36. The cylindrical portion 46 also allows the ball stud 36 to move axially within the inner bore of the housing 22 while still providing radial support to the ball portion 38 and minimizing changes in the torque required to rotate the ball stud 36 relative to the housing 22 as the ball stud 36 and the backing bearing 42 wear during use.

In the exemplary embodiment of the socket assembly 20, a second bearing 48 (hereinafter referred to as an "exit bearing" 48) is located in the second counterbore 34 of the inner bore of the housing 22 and has a generally spherically curved bearing surface for providing a low friction interface with an upper hemisphere of the ball portion 38 of the ball stud 36. The exit bearing 48 is made as a completely separate piece from the backing bearing 42 and is spaced from the backing bearing 42 within the inner bore of the housing 22 by a gap. A cover plate 50 is positioned in the first counterbore 32 of the housing 22 adjacent the open end 26, and a flange 52 of the housing 22 is bent inwardly (for example, through spinning or swaging) to trap the cover plate 50, the exit bearing 48, the backing bearing 42 and the ball portion 38 of the ball stud 36 within the open bore of the housing 22. A boot 54 is further provided and is sealed against the shank portion 40 of the ball stud 36 and against the cover plate 50 and the housing 22 for sealing a lubricant, such as grease, within the inner bore of the housing 22 and for keeping contaminants out of the inner bore of the housing 22. In the exemplary embodiment, the end of the boot 54 that is sealed against the cover plate 50 is sandwiched between the cover plate 50 and the exit bearing 48. This end of the boot 54 further includes a Belleville washer 56 (also known as a washer spring) at least partially embedded therein for applying a biasing force against the exit bearing 48 to pre-load the bearing surface of the exit bearing 48 against the ball portion 38 of the ball stud 36.

In the exemplary embodiment of the ball joint assembly 20, the generally closed first end 24 of the housing 22 and the backing bearing 42 have co-axial lubricant openings 58, 60, and a grease fitting is received within the lubricant opening 58 in the housing 22 for conveying grease, or any suitable lubricant, into the inner bore of the housing 22 to reduce friction between the bearings 42, 48 and the ball portion 38 of the ball stud 36.

The backing bearing 42 further includes a plurality of cavities or lubricant wells 62, 64 for receiving and storing grease (or any other lubricant) to lubricate areas of the backing bearing 42 that otherwise would see little or no lubrication during operation of the steering or suspension system. That is, the lubricant wells 62, 64 serve as grease sumps for temporarily storing grease and releasing the grease when its needed. As such, as the spherical ball portion 38 and the inner bearing surface 44 of the backing bearing 42 wear into one another, the lubrication between the contact surfaces is enhanced as compared to with a backing bearing without lubricant wells. In the exemplary embodiment, a plurality of the lubricant wells 62, 64 are first lubricant wells 62 which extend only partially but not fully through the backing bearing 42, and a plurality of the lubricant wells 62, 64 are second lubricant wells 64 which extend all the way through the backing bearing 42. In the exemplary embodiment, the lubricant wells 62, 64 are generally uniformly spaced from one another to provide for a generally uniform distribution of the lubricant around the inner bearing surface of the backing bearing 42.

Figure 2:
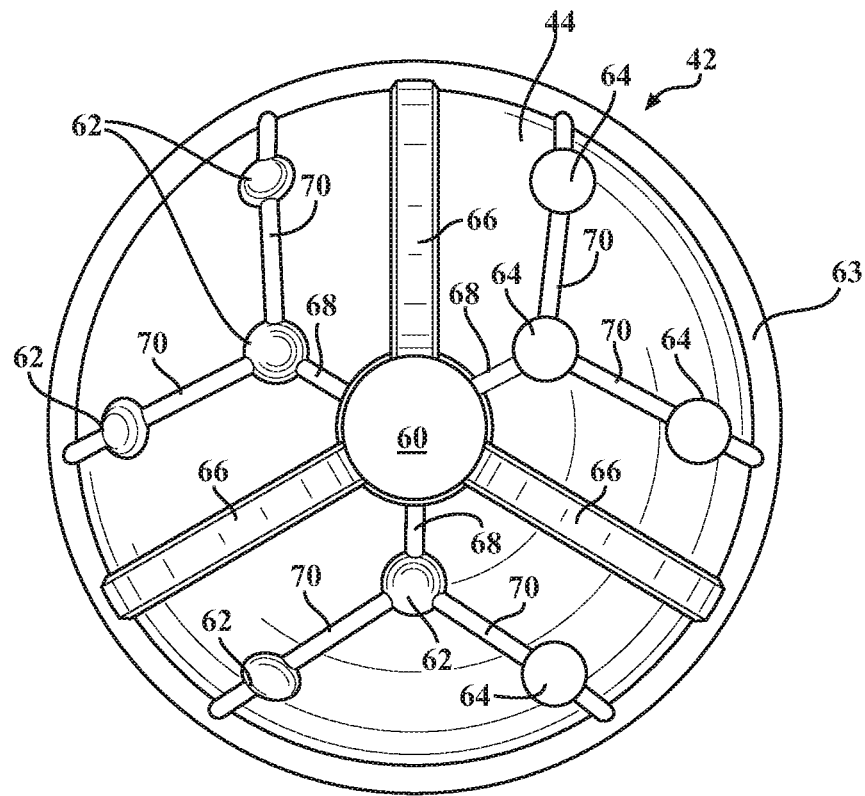
FIG. 2 is a top elevation view of an exemplary embodiment of a backing bearing from the socket assembly of FIG. 1.
Figure 3:
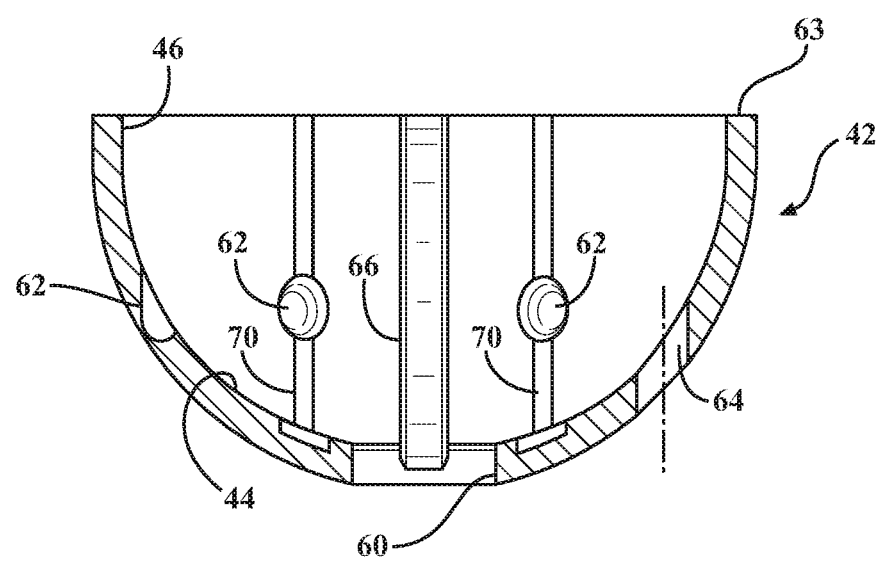
FIG. 3 is a cross-sectional view of the backing bearing of FIG. 2.
Figure 4:
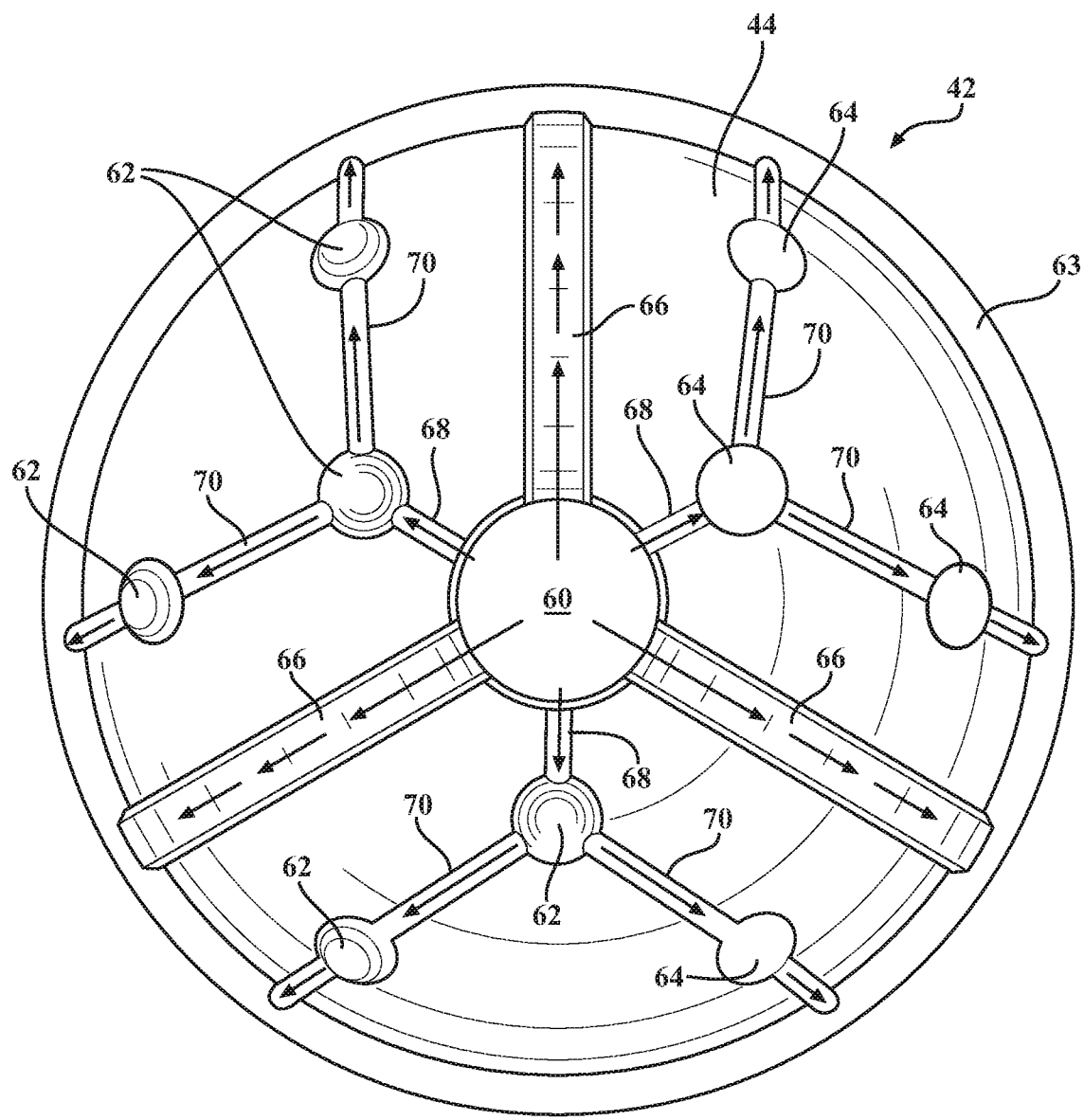
FIG. 4 is another top elevation view of the backing bearing and showing paths for the flow of lubricant during greasing of the socket assembly.

Referring now to FIGS. 2-4, the backing bearing 42 further includes a plurality of lubricant grooves 66, 68, 70 formed into its bearing surface. A plurality of the lubricant grooves 66, 68, 70 are first lubricant grooves 66 which extend from the lubricant opening 60 through the semi-spherically curved portion 44 and the cylindrical portion 46 to an opposite side of the backing bearing 42 for conveying the lubricant past the backing bearing 42 and into the gap between the backing and exit bearings 42, 48. The exemplary embodiment includes a total of three of the first grooves 66, and those first grooves 66 are generally uniformly spaced from one another by approximately 120° from one another.

A plurality of the lubricant grooves 66, 68, 70 in the bearing surface of the backing bearing 42 are second lubricant grooves 68 which extend from the lubricant opening 60 of the backing bearing 42 to a plurality of the lubricant wells 62, 64, which are further joined through a plurality of lubricant grooves 70 that further extend to the upper most surface 63 of the backing bearing 42. The bearing surface 44 of the backing bearing 42 further includes a third set of lubricant grooves 66, which further extend between lubricant wells 62, 64 and which extend from the lubricant opening 60 to the upper most surface 63 of the backing bearing 42. When the socket assembly 20 is initially greased and regreased, the lubricant is injected through the lubricant openings 58, 60 in the housing 22 and the backing bearing 42. As shown in FIG. 4, some of the lubricant flows from the lubricant opening 60 through the first grooves 66 and past the backing bearing 42. The remainder of the lubricant flows through the second lubricant grooves 68 into a plurality of the lubricant wells 62, 64. Once those lubricant wells 62, 64 are full of lubricant, then additional lubricant flows through the third lubricant grooves 70 and into additional ones of the lubricant wells 62, 64. As such, in one simple regreasing process, a mechanic is able to quickly fill the lubricant wells 62, 64 without any special tools other than a conventional grease gun.

Another aspect of the present invention is a method of making a socket assembly 20 such as the socket assembly 20 shown in FIG. 1. The method includes the step of preparing a housing 22 with an inner bore which extends along an axis A from a closed first end 24 to an open second end 26. The method continues with the step of inserting a backing bearing 42 with a bearing surface and a lubricant opening 60 into the inner bore of the housing 22. The method continues with the step of inserting a ball portion 38 of a ball stud 36 into the inner bore of the housing 22 such that an outer surface of the ball portion 38 is in surface-to-surface contact with the bearing surface of the backing bearing 42 to facilitate relative rotation between the housing 22 and the ball stud 36. The method proceeds with the step of injecting a lubricant into the inner bore of the housing 22. The method continues with the step of channeling the lubricant through at least one lubricant groove 66, 68, 70 formed into the bearing surface of the backing bearing 42 to at least one lubricant well 62, 64 formed into the backing bearing 42 and extending less than fully through the backing bearing 42 to fill the lubricant well 62, 64 with the lubricant. Specifically, in the exemplary method, the lubricant is channeled through a plurality of second lubricant grooves 68 from the lubricant opening 60 into a plurality of the lubricant wells 62, 64 and through a plurality of third lubricant grooves 70 from some of the lubricant wells 62, 64 to other lubricant wells 62, 64.

Obviously, many modifications and variations of the present invention are possible in light of the above teachings. It is, therefore, to be understood that within the scope of the appended claims, the invention may be practiced otherwise than as specifically described.

What is claimed is:

1. A socket joint assembly, comprising:
a housing with an inner bore which extends along an axis from a first end to an open second end;
a ball stud including a ball portion that is received in said inner bore of said housing and including a shank portion that projects out of said inner bore through said open second end;
said ball portion having a first hemisphere, a second hemisphere, and an equator;
a backing bearing disposed in said inner bore of said housing adjacent said first end and having a bearing surface, said bearing surface having a semi-spherical portion that is in surface-to-surface contact with an outer surface of said first hemisphere of said ball portion of said ball stud, said bearing surface having a cylindrical portion that is in surface-to-surface contact with said equator of said ball portion of said ball stud, and said cylindrical portion extending with a constant diameter past said equator in a direction towards said open second end of said housing such that the equator can remain in contact with said bearing surface in response to movement of said ball portion in an axial direction towards said open second end of said housing;
an exit bearing disposed in said inner bore of said housing adjacent said open second end and being in surface-to-surface contact with said second hemisphere of said ball portion of said ball stud;
said exit bearing being spaced in an axial direction from said backing bearing by a gap which surrounds said ball portion of said ball stud;
a spring applying a biasing force on said exit bearing and preloading said exit bearing against said second hemisphere of said ball portion of said ball stud;
said backing bearing having a lubricant opening extending therethrough;
said backing bearing including a plurality of lubricant wells which are spaced around said bearing surface from one another for holding a lubricant; and
said backing bearing further including a plurality of lubricant grooves formed into said bearing surface and extending from said lubricant opening of said backing bearing to at least one of said lubricant wells for replenishing said at least one lubricant well during regreasing of said socket assembly and wherein at least one of said lubricant grooves extends along said cylindrical portion of said bearing surface past said equator of said ball portion of said ball stud for channeling lubricant to the gap between said backing and exit bearings.

2. The socket assembly as set forth in claim 1 wherein at least one of said lubricant wells extends less than fully through said backing bearing.

3. The socket assembly as set forth in claim 1 wherein at least one of said lubricant grooves extends from one of said lubricant wells to another of said lubricant wells.

4. The socket assembly as set forth in claim 1 wherein at least one of said lubricant grooves does not extend to any of said lubricant wells for allowing lubricant to pass said backing bearing during regreasing of said socket assembly.

5. The socket assembly as set forth in claim 1 further including a cover plate disposed in said inner bore adjacent said open second end.

6. The socket assembly as set forth in claim 5 wherein said open second end of said housing is deformed to trap said cover plate in said inner bore of said housing.

7. The socket assembly as set forth in claim 1 wherein said housing has a wall at said first end.

8. The socket assembly as set forth in claim 7 wherein said wall at said first end of said housing has a lubricant opening which is co-axially aligned with said lubricant opening of said backing bearing.

9. The socket assembly as set forth in claim 1 wherein said bearing surface of said backing bearing has a radius of curvature which matches a radius of curvature of said outer surface of said ball portion of said ball stud.

10. A method of making a socket assembly, comprising the steps of:
preparing a housing with an inner bore which extends along an axis from a first end to an open second end;
inserting a backing bearing with a bearing surface and with a lubricant opening into the inner bore of the housing, the bearing surface having a semi-spherical portion and a cylindrical portion;
inserting a ball portion of a ball stud into the inner bore of the housing such that a first hemisphere of the ball portion is in surface-to-surface contact with the semi-spherical portion of the bearing surface and such that an equator of the ball portion is in surface-to-surface contact with the cylindrical portion of the bearing surface of the backing bearing to facilitate relative rotation between the housing and the ball stud and wherein the cylindrical portion extends with a constant diameter past the equator in an axial direction towards the open second end of the housing;
inserting an exit bearing into the inner bore of the housing such that the exit bearing is in surface-to-surface contact with a second hemisphere of the ball portion of the ball stud and such that the exit bearing is spaced from the backing bearing by a gap which surrounds the ball portion of the ball stud;
inserting a spring into the inner bore and imparting a biasing force on the exit bearing to preload the exit bearing against the ball portion of the ball stud;
injecting a lubricant into the inner bore of the housing;
channeling the lubricant through a plurality of lubricant grooves formed into the bearing surface of the backing bearing from the lubricant opening of the backing bearing to at least one lubricant well formed into the backing bearing and extending less than fully through the backing bearing to fill the lubricant well with the lubricant; and
further channeling the lubricant through the plurality of lubricant grooves formed into the cylindrical portion of the bearing surface of the backing bearing past the equator of the ball portion of the ball stud and into the gap between the backing and exit bearings.

11. The method as set forth in claim 10 further including the step of channeling the lubricant from at least one lubricant well to another lubricant well through at least one lubricant groove.

* * * * *